United States Patent [19]

Zaopo et al.

[11] Patent Number: 4,769,287
[45] Date of Patent: Sep. 6, 1988

[54] INSULATION MATERIAL OF NON-CROSS-LINKED POLYMER AND POLYMERIZED SILANIC MONOMER AND ELECTRICAL CABLES INSULATED THEREWITH

[75] Inventors: Antonio Zaopo; Flavio Casiraghi, both of Milan; Alessandro Secco, Bareggio, all of Italy

[73] Assignee: Societa' Cavi Pirelli S.p.A., Milan, Italy

[21] Appl. No.: 943,602

[22] Filed: Dec. 18, 1986

[30] Foreign Application Priority Data

Dec. 20, 1985 [IT] Italy ............................ 23313 A/85

[51] Int. Cl.$^4$ ............................................. B32B 15/00
[52] U.S. Cl. ..................................... 428/379; 428/375; 428/383; 428/387; 428/391; 174/110 SR; 174/110 S; 174/110 FC; 174/110 N; 174/110 V
[58] Field of Search ............... 428/379, 387, 447, 391, 428/383; 174/110 SR, 110 V, 110 N, 110 FC, 110 S

[56] References Cited

U.S. PATENT DOCUMENTS 4,400,429  8/1983  Barlow et al. ................... 428/391
4,726,993  2/1988  Zaopo et al. .................... 428/379

Primary Examiner—Sharon A. Gibson
Attorney, Agent, or Firm—Brooks, Haidt, Haffner & Delahunty

[57] ABSTRACT

An electric cable having at least one conductor and at least one covering therefor obtained from the polymerization of a silanic monomer of a compound comprising a non-cross-linked base-polymer and a polymerizable silanic monomer present prior to polymerization in a quantity not less than 5 parts by weight with respect to 100 parts by weight of the base-polymer. The polymerization of the silanic monomer units forms a polymeric mesh which is closely interconnected and thoroughly compenetrated into the non-cross-linked base-polymer. In one embodiment the polymeric mesh may be grafted onto the base-polymer through the addition of an organic peroxide. Thus, there is provided an electric cable for use as building wires wherein the conductor covering is not cross-linked but is heat resistant to temperatures above the deformation temperature of the base-polymer.

5 Claims, 1 Drawing Sheet

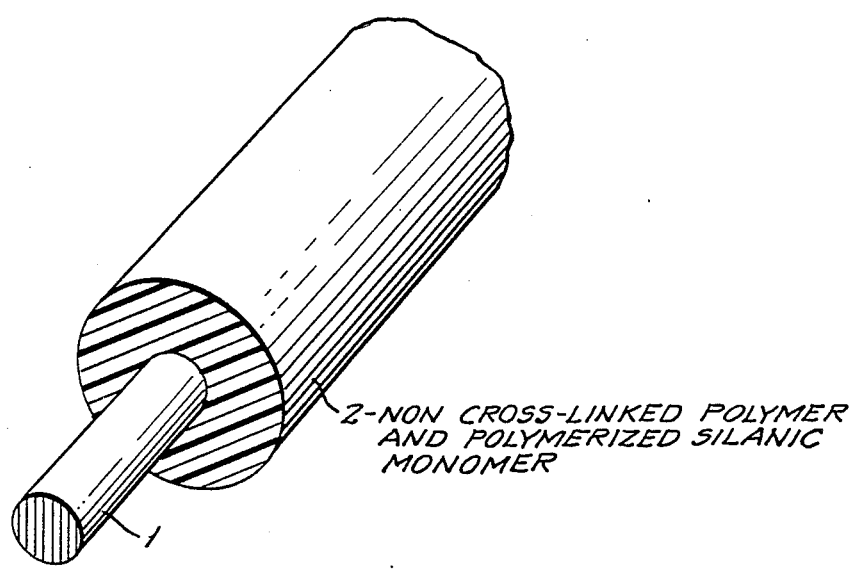

INSULATION MATERIAL OF NON-CROSS-LINKED POLYMER AND POLYMERIZED SILANIC MONOMER AND ELECTRICAL CABLES INSULATED THEREWITH

DESCRIPTION

The present invention relates to electrical cables provided with a conductor covering acting as an insulation and/or a sheath of the heat resistant type, which are known as building wires and are used in civil and military installations.

The invention also relates to a material for forming the coverings that serve the purpose of insulation and/or a sheath for cable conductors.

Known heat resistant cables have conductor coverings which are formed either with compounds of cross-linked polymeric material, or else, with non-cross-linked polymeric materials which, however, have a very high heat deformation temperature.

In fact, a parameter to be taken into consideration for evaluating the heat resistance of a cable is the temperature of deformation under mechanical load of the material forming the conductor covering which, for the non-cross-linked materials, depends upon the mechanical deformability, when hot, of the compound's base-polymer out of which the coverings are made.

This condition, for the cables having non-cross-linked coverings, gives rise to limitations in the choice of the base polymers for the compounds, i.e., the limitation is greater when the heat resistance required by the cables is higher.

In fact, with the increasing of the heat resistance required, the number of the polymers which present values for the deformation temperature which are sufficiently high for attaining said objective diminishes upto the point of even accepting other drawbacks such as, for example, in case the choice requires using fluoropolymers possessing a high softening temperature, accepting the drawback of poisonous and corrosive toxic smoke being formed by such fluoropolymers in case of fires.

Moreover, the limitation in the choice of polymers is directed at imposing the use of those polymers the costs of which will also increase as the heat resistance required of the cable increases, and hence, the cable costs increase to unacceptable values for many of the applications for which the cables of the type in question are intended.

The alternative presently existing for the formation of conductor coverings serving the purpose of insulation and/or a sheath is to have recourse to cross-linking the polymers, for example, through irradiation which requires the making use of complex and costly equipment which, furthermore, does not always prove to be practicable.

One object of the present invention is to provide cables for building wires for use in civil and military installations wherein the conductor covering is not cross-linked but which provides for each type of use, the desired heat resisting characteristic even though the covering is formed from a polymer base compound which has a deformation temperature which is insufficient for providing said desired heat resistance.

Another object of the present invention is a material in the form of a non-cross-linked polymer base compound which is capable of formating non-cross-linked coverings which serve the purpose of insulation and/or a sheath for cable conductors and which have a high heat-resistance even though it is formed with base polymers possessing a lower deformation temperature.

In accordance with the invention, an electric cable comprising at least one conductor and at least one covering for it which serves the purpose of an insulation and/or a sheath, such covering being made of a material, which is obtained by starting with a compound comprising a non-cross-linked base polymer as well as a polymerizable monomer and by polymerizing the said monomer, said base polymer being selected from among polyesters, polyarylates, aromatic polyether-sulfones, aromatic polysulfones, aromatic polysulphides, aromatic polyether-imides, aromatic polyimides, aromatic polyamides, aromatic polyimideamides, polyphenyleneoxides, ethylene-tetrafluoroethylene copolymers, ethylene-trifluorochloroethylene copolymers and vinylidene fluorides, either by themselves or in mixtures with other polymers, characterized by the fact that the polymerizable monomer is a silanic monomer and that, prior to the polymerization, said silanic monomer is present in the compound in a quantity of not less than 5 parts by weight with respect to 100 parts by weight of the base polymer.

In the compound used for forming the conductor covering, there can advantageously be present an organic peroxide having a decomposition temperature of not less than 130° C. in a quantity not exceeding 0.15 parts by weight for 100 parts by weight of polymer.

The invention is also a material for forming non-cross-linked coverings of electrical conductors which serve the purpose of insulation and/or a sheath and which have the composition of the covering described hereinbefore.

In the material for making the coverings of cable conductors, there can advantageously be present an organic peroxide having a decomposition temperature of not less than 130° C. in a quantity not exceeding 0.15 parts by weight with respect to 100 parts by weight of base polymer.

Other objects and advantages of the present invention will be apparent from the following detailed description of the presently preferred embodiments thereof, which description is a cross-sectional, perspective view of an electrical cable of the invention.

As can be seen in the drawing, the cable comprises a conductor 1 surrounded by a covering 2 which serves the purpose of insulation and/or a sheath, the characteristics of which will be described hereinafter. The conductor 1 is made, for example, of copper or aluminum and is illustrated by a single wire but the conductor may be formed by a plurality of layed-up wires.

In the cable shown in the drawing, the covering 2 is illustrated as a single layer, but said covering 2 can also be formed by several layers at least one of which is made of a material described hereinafter. For example, the covering 2 can be formed by two layers one of which, the inner one which contacts the conductor, serving as insulation, whereas the outer layer, which completely surrounds the inner layer, carries out the function of a sheath.

The characteristic of the cables according to the invention is that the conductor covering 2 comprises at least one layer made of a material which is obtained by starting from a compound which comprises the following two main components.

The first component of the compound is an organic polymer, chosen from among polyesters, polyarylates, aromatic polyether sulfones, aromatic polysulfones, aromatic polysulphides, aromatic polyether-imides, aromatic polyimides, aromatic polyamides, aromatic polyimide-amides, polyphenylene-oxides, ethylene-tetrafluoroethylene copolymers, ethylene-trifluorochloroethylene copolymers and vinylidene fluorides, either by themselves, in mixtures, of any proportion, with the other polymers.

The second main component, is a polymerizable silanic monomer whose content in the compound should not be less than 5 parts by weight, and preferably not less than 10 parts by weight, with respect to 100 parts by weight of polymer. The content in the compound of the silanic monomer is relative to the content of the polymer. Preferably, the silanic monomer is present in the compound in a quantity not exceeding 100 parts by weight with respect to 100 parts by weight of the polymer.

Preferably, the silanic monomer is of the type which corresponds to the following chemical formula:

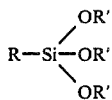

where: R is an aliphatic group containing a double bond and having from 1 to 18 carbon atoms, for example a vinyl or an allyl; is an aliphatic group having from 1 to 18 carbon atoms and containing one or more SH or $NH_2$ groups; or is a group corresponding with the formula:

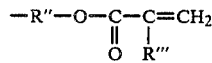

R″ is an alkane of a linear or branched chain, having from 1 to 18 carbon atoms, and R‴ can be equal to R″ or else, it can be hydrogen; and R′ is chosen from the alkane radical groups of a linear or branched chain, having from 1 to 18 carbon atoms and the group corresponding with the formula:

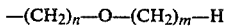

The above-described silanic monomers have the property of polymerizing, in presence of humidity, through a hydrolysis of the —OR′ groups which can be aided by the addition of a catalyst of a per se known type (for effectuating said function) such as, for example: dibutyltin dilaurate.

In the above-described compound, the silanic monomers are uniformly dispersed in the base-polymer, and their polymerization gives rise to the formation of a silanic polymeric mesh which is closely interconnected, and thoroughly compenetrated into the base polymer mass.

For the purpose of the present invention, the silanic polymeric mesh interconnected with the base polymer mass, must be dense, widely extended and, as far as possible, continuous. For this purpose, it is essential for the minimum quantity of the monomer which is present in the compound to be not less than 5 parts by weight and, preferably, not less than 10 parts by weight, with respect to 100 parts by weight of base polymer. In fact, with lesser quantities of monomer in the compound, the mesh formed, after its polymerization, is not effective enough for the purpose of the present invention. While the quantity of the silanic monomer present in the compound is relative to the content of the polymer in the compound, it is preferable that the silanic monomer is present in the compound in a quantity not exceeding 100 parts by weight with respect to 100 parts by weight of the polymer.

Moreover, in addition to the two above-indicated components in the compound, there can even be advantageously present, as a third component, an organic peroxide, having a decomposition temperature not less than 130° C., provided that the quantity of said peroxide is not greater than 0.15 parts by weight with respect to 100 parts by weight of polymer.

Examples of satisfactory organic peroxides are dicumylperoxide, α-α′-bis (tert-butylperoxide) di-isopropylbenzene, and (tert-butylperoxide) methyl-cumyl.

The addition of the peroxide into the compound can be advantageously used when, besides the formation of the silanic polymeric meshing—interconnected and compenetrated with the base-polymer, it is also desired to obtain a grafting of said mesh onto said base polymer because the peroxide is suitable for furnishing free radical groups which constitute the initiators of the grafting-reaction.

Nevertheless, it is necessary to restrict the quantity of the peroxide in the compound to below 0.15 parts by weight with respect to 100 parts by weight of base polymer, for minimizing the inevitable decomposition reaction of the base polymer chains which the presence of a peroxide causes.

A compound according to the invention containing at least the two main components described previously and, a peroxide is extruded around the cable conductor 1 after a grafting of at least one part of the silanic monomers on the base polymer (as a result of the reaction between the base polymer, the peroxide, and the R group of the silanic monomers) followed by the polymerization of the silanic monomers (due to the effect of a reaction between such which takes place by means of the OR′ groups and of water as a reacting agent) which provides the conductor covering 2 and hence, a cable according to the invention.

As a consequence, the conductor covering 2 (formed by starting with the previously described compound) comprises a non-cross-linked base polymer that is interpenetrated into the meshes of a silanic polymer mesh which, in its turn, is linked at some points to the base polymer.

The cables according to the invention can be produced—through a process that comprises the steps set forth hereinafter.

By means of extrusion, a compound comprising the organic base polymer, and the silanic monomer, and optionally, the peroxide is formed around the cable-conductor.

If the peroxide should be present, the grafting of at least a part of the silanic monomer on the base polymer is effectuated by the organic peroxide and through the action of heat and the mechanical working to which the compound is subjected during its passage through the device with which the extrusion of the compound on the cable-conductor is carried out.

In any case, following the extrusion, the silanic monomer is polymerized (either grafted or non-grafted on the base polymer) by subjecting the cable, with its extruded covering, to the action of water, for example, of steam.

At the termination of the step of polymerization of the silanic monomer contained in the layer of compounded extruded around the conductor, there is obtained a cable according to the invention.

There will now be given examples of compounds with which the cable coverings according to the invention, are formed, and which constitute examples of the materials, according to the invention, used for forming cable coverings which serve as conductor insulation and/or sheaths.

EXAMPLE I

| | |
|---|---|
| POLYPHENYLENE-OXIDE - sold by General Electric Co. under the name "NORYL PX-1733" | 100 parts by weight |
| VINYL-TRI-METHOXY-ETHOXY-SILANE | 15 parts by weight |
| TIN-DIBUTYL-DILAURATE | 0.1 parts by weight |

EXAMPLE II

| | |
|---|---|
| POLYPHENYLENE-OXIDE - sold by General Electric Co. under the name "NORYL PX-1733" | 100 parts by weight |
| VINYL-TRI-METHOXY-ETHOXY-SILANE | 25 parts by weight |
| TIN-DIBUTYL-DILAURATE | 0.1 parts by weight |

EXAMPLE III

| | |
|---|---|
| POLYPHENYLENE-OXIDE - sold by General Electric Co. under the name "NORYL PX-1733" | 100 parts by weight |
| VINYL-TRI-METHOXY-ETHOXY-SILANE | 25 parts by weight |
| (TERT-BUTYL-PEROXIDE) METHYL-CUMYL | 0.05 parts by weight |
| TIN-DIBUTYL-DILAURATE | 0.1 parts by weight |

EXAMPLE IV

| | |
|---|---|
| VINYLIDENE FLUORIDE - sold by SOLVAY & CIE Co. under the name "SOLEF 3008" | 100 parts by weight |
| VINYLIDENE-TRI-METHOXY-ETHOXY-SILANE | 20 parts by weight |
| TIN-DIBUTYL-DILAURATE | 0.1 parts by weight |

With the materials set forth in the EXAMPLES I to IV plates having a nominal thickness of 1.2 mm were molded and treated with steam for causing the polymerization of the silanic monomers, after, for the material of EXAMPLE III, providing for grafting the silanic monomer onto the base-polymer. Thereafter, from these plates there were obtained, through die-cutting, circular test samples having a diameter of 8 mm.

Penetration tests were carried-out on the test samples as a function of the temperature of a metallic sphere with a diameter of 2 mm.

Said tests were carried-out with a MODEL TMA40 thermo-mechanical analyzer sold by the METTLER Co.

For the tests in question, the test samples were disposed in-between the flat base of the apparatus and the above-cited sphere.

The force applied on the sphere was $5 \times 10^{-2}$N. Moreover, during the tests, the temperature of the test samples was caused to increase, according to a linear program, from room-temperature to 220° C. at a rate of 5° C. per minute.

Curves which gave the penetration values of the sphere, as a function of the temperature, were prepared from the test data and the more significant values obtained are given in the following

| SAMPLES | INITIAL SOFTENING TEMPERATURE IN °C. of the BASE POLYMER | TEMPERATURE corresp. to a penetration of 600μ in °C. | PENETRATION at 200° C. in microns |
|---|---|---|---|
| NORYL PX-1733 | 90 | 170 | 1200 (test-sample - completely perforated) |
| EXAMPLE I | 90 | 240 | 260 |
| EXAMPLE II | 90 | 280 | 150 |
| EXAMPLE III | 90 | 285 | 140 |
| SOLEF 3008 | 170 | 175 | 1200 (test-sample - completely perforated) |
| EXAMPLE IV | 170 | 240 | 360 |

Moreover, with the compound of the examples, cables according to the invention, were made with a tin coated copper conductor of diameter 1.0 mm and with a thickness of 0.1 mm for the conductor covering.

Experimental tests (to be specified further) were carried out with these cables for demonstrating the heat resistance properties, of the conductor covering.

Identical experimental tests were carried-out on cables for comparison purposes, the latter cables having the same dimensions as those according to the invention but having their coverings formed exclusively out of the hereinbefore identified polymers, namely, "NORYL PX-1733" and "SOLEF 3008".

Test pieces 10 mm long, of the cable samples were utilized for these tests. Compression tests on the conductor coverings, were carried-out on said cable samples as a function of the temperature. For this purpose, the cable pieces forming the test samples were disposed between a flat base, in such a way that they touched the base exclusively with their conductor coverings, and a cylindrical punch having a diameter of 3 mm.

The apparatus used was the one previously described for the tests on the materials alone, but with the difference that a cylindrical punch was substituted for the sphere punch.

The force which was applied to the cylindrical punch, was $2 \times 10^{-2}$N. Moreover, during the tests carried-out on these cable samples, the temperature of the latter was caused to increase, according to a linear program, from room-temperature to 220° C., at a rate of 10° C. per minute.

Curves showing the flattening values (i.e. the reduction in the cable's outer diameter) as a function of the temperature were prepared from the test data, significant values obtained, are given in the following TABLE II.

| CONDUCTOR-COVERINGS MATERIALS | FLATTENINGS at 200° C. in microns |
|---|---|
| NORYL PX-1733 | 160 |
| EXAMPLE I | 50 |
| EXAMPLE II | 30 |
| EXAMPLE III | 25 |
| SOLEF 3008 | >200 (insulation completely flattened) |
| EXAMPLE IV | 60 |

The results of the experimental-tests, given in the TABLES I and II—substantiate the following observations.

From TABLE I, it can be seen that the temperature necessary for obtaining a penetration of 600 microns (corresponding to half the nominal thickness of the test samples) increases when the quantity of the silanic monomer which is present in the compound is increased and hence with the amount, density and extent of the silanic polymer mesh in which the base polymer is compenetrated.

It can also be seen that, the presence of a peroxide, which provides for grafting the mesh to the base polymer, increases the temperature which is necessary for obtaining penetration values of 600 microns.

Moreover, in TABLE I—it can be observed that at a conventional temperature of 200° C., the penetration values are reduced as the quantity of monomer present in the compound is increased, and with the presence of a peroxide in said latter mechanical characteristics, when hot, are further improved. Thus, the improved characteristics are obtained with the material according to the invention no matter what base polymer is used, and that, once a base polymer is chosen—in spite of its low temperature of deformation, it is still possible to realize substantial increases in the mechanical characteristics of the compound with which the base polymer is formed.

The improvements in the mechanical characteristics when hot, of the materials according to the invention, permit realizing cables with non-cross-linked conductor coverings, having an improved resistance to heat, and provide numerous possibilities for selecting the base polymers from which the compounds for said conductor coverings are formed.

The results given in TABLE II confirm this fact, since they prove that the resistance-to flattening when hot, of the conductor-coverings which are made with materials according to the invention, is considerably increased with respect to the base polymers of the compounds.

A further confirmation of this fact, was obtained by subjecting a cable according to the invention and, in particular, a cable having a conductor-covering made from the compound of EXAMPLE II, to a test which is known as the "ACCELERATED AGING TEST" according to the Standard MIL-W81044/4B which is usually adopted for evaluating the thermal behavior of the cables of the type in question.

There was also subjected to the same test, a cable for comparison purposes, wherein the conductor-covering was formed exclusively with only the base polymer of the compound of EXAMPLE II.

In this test, the length of cable according to the invention, as well as the length of cable for comparison purposes, were disposed in an U-shaped configuration around a mandrel having a diameter of 17.5 mm, and weights of 0.190 Kg were then applied to each of the extremities of the cable lengths.

The mandrel and the cable lengths were housed inside an air-circulating furnace which was maintained at a temperature of 225° C. ±2° C. for a period of 6 hours.

Once this period of time was over, a cooling was effectuated —to bring the assembly of the mandrel and cable lengths to a temperature of 20° C.—in one hour's time.

After this treatment, the cable lengths were completely wound around the 17.5 mm diameter mandrel, first in one sense and then in the sense opposite, while subjecting the cable lengths to pulling-stresses with weights of 2 Kg applied to their extremities.

Once this operation was terminated, the cable lengths were immersed in a 5% sodium chloride water solution. After a 5 hour period of immersion, a voltage of 3 Kv was applied between extremities of the conductors of the cables and the solution, said voltage being maintained for a period of 5 minutes.

The cable according to the invention passed the voltage test with said applied voltage—whereas the same cannot be said of the cable for comparison purposes. This fact confirms that cables according to the invention attain the stated objects.

Although preferred embodiments of the present invention have been described and illustrated, it will be apparent to those skilled in the art that various modifications may be made without departing from the principles of the invention.

The embodiment of the invention in which an exclusive property or privilege is claimed are defined as follows:

1. An electric cable comprising at least one conductor and at least one covering thereof obtained from the polymerization of a silanic monomer of a compound comprising a polymerizable silanic monomer and a non-cross-linked base-polymer, said base-polymer selected from the group consisting of polyesters, polyarylates, aromatic polyether-sulfones, aromatic polysulfones, aromatic polysulphides, aromatic polyether-imides, aromatic polyimides, aromatic polyamides, aromatic polyimideamides, aromatic polyphenylene-oxides, ethylene-tetrafluoroethylene copolymers, ethylene-trifluorochloroethylene copolymers, vinylidene fluorides, and mixtures thereof, the polymerizable silanic monomer units being polymerized with other silanic monomer units and forming a polymeric mesh which is closely interconnected, and thoroughly compenetrated into the non-cross-linked base-polymer, the said silanic monomer units being present prior to polymerization in a quantity of not less than 5 parts by weight with respect to 100 parts by weight of polymer.

2. An electric cable according to claim 1 wherein the silanic monomer is present in a quantity of not less than 10 parts by weight with respect to 100 parts by weight of polymer.

3. An electric cable according to claim 1 wherein the silanic monomer is present in a quantity of 5 to 100 parts by weight with respect to 100 parts by weight of polymer.

4. An electric cable according to claim 1 wherein the compound, prior to polymerization of the silanic monomer, additionally contains an organic peroxide having a decomposition temperature of not less than 130° C., in a quantity not exceeding 0.15 parts by weight with respect to 100 parts by weight of polymer.

5. An electric cable according to claim 1 wherein the polymerizable silanic monomer is a monomer corresponding to the formula:

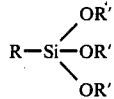

where

R is selected from the group consisting of aliphatics having from 1 to 18 carbon atoms and a double bond, aliphatics having from 1 to 18 carbon atoms and one or more —SH, aliphatics having from 1 to 18 carbon atoms and one or more —NH$_2$, and that which corresponds to the formula

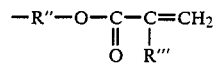

wherein R″ is a linear or branched chain alkane having from 1 to 18 carbon atoms, and R‴ is selected from the group consisting of R″ and hydrogen; and R′ is selected from the group consisting of linear or branched chain alkane radicals having from 1 to 18 carbon atoms, and that which corresponds to the formula

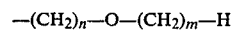

wherein n and m are whole numbers between 1 to 6, inclusive.

* * * * *

UNITED STATES PATENT AND TRADEMARK OFFICE
CERTIFICATE OF CORRECTION

PATENT NO. : 4,769,287

DATED : September 6, 1988

INVENTOR(S) : Zaopo et al

It is certified that error appears in the above-identified patent and that said Letters Patent is hereby corrected as shown below:

Col. 3, line 47, insert --where: $\underline{n}$ and $\underline{m}$ are whole numbers between 1 and 6.--

Col. 6, line 35, insert --TABLE I--.

Signed and Sealed this

Twenty-first Day of March, 1989

*Attest:*

DONALD J. QUIGG

*Attesting Officer*  *Commissioner of Patents and Trademarks*